Feb. 9, 1965  R. E. LACEY  3,169,239
CIRCUIT BREAKING RECEPTACLE
Filed Oct. 30, 1961  2 Sheets-Sheet 1
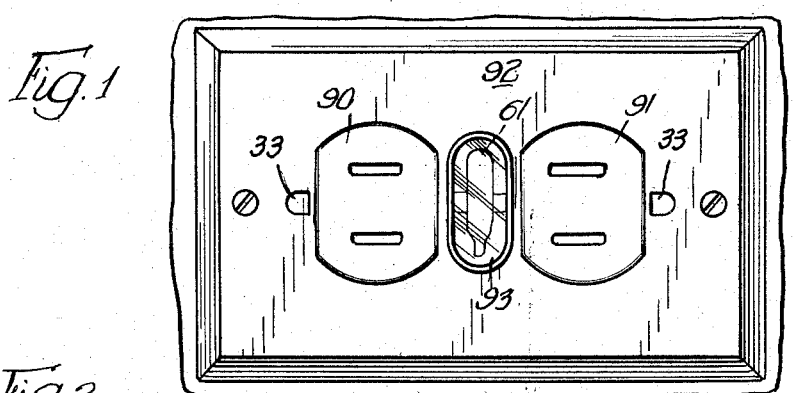
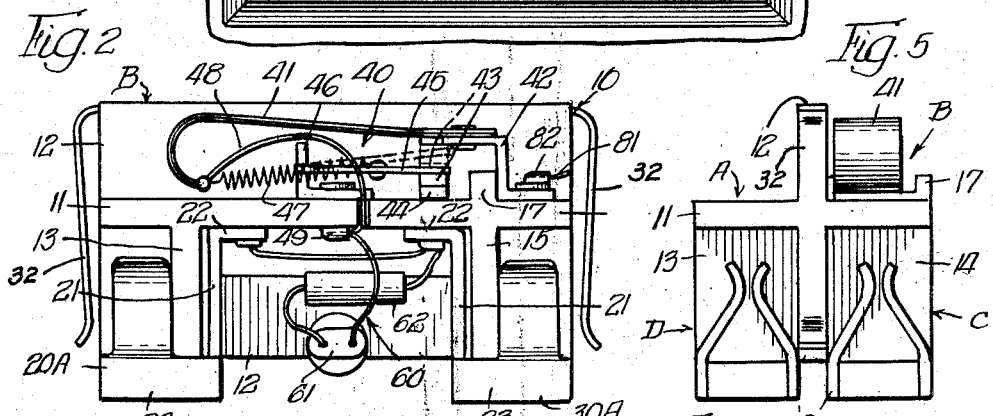
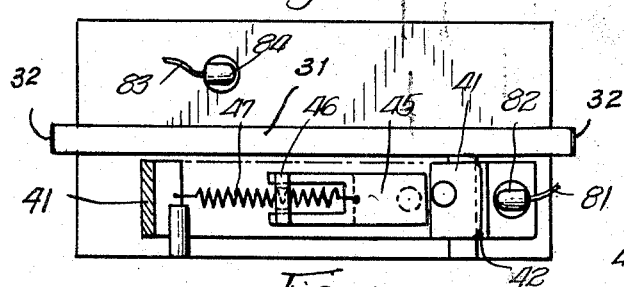
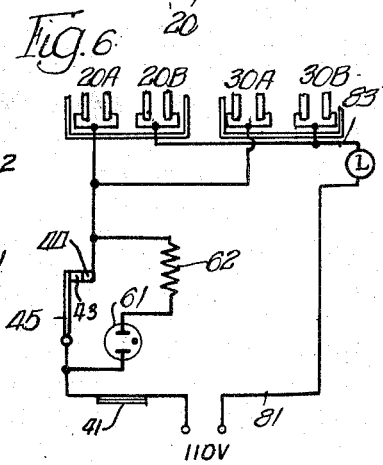
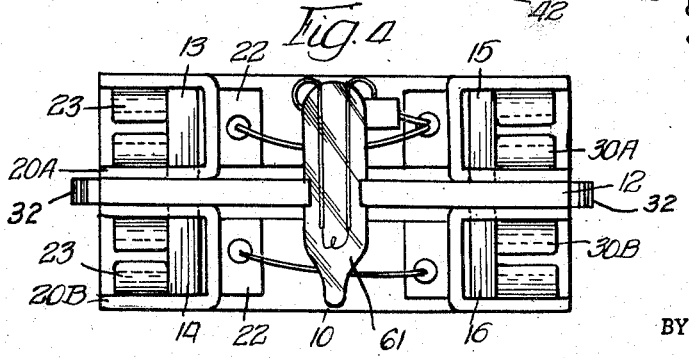
INVENTOR.
Robert E. Lacey
BY Sabin C. Bronson.
atty.

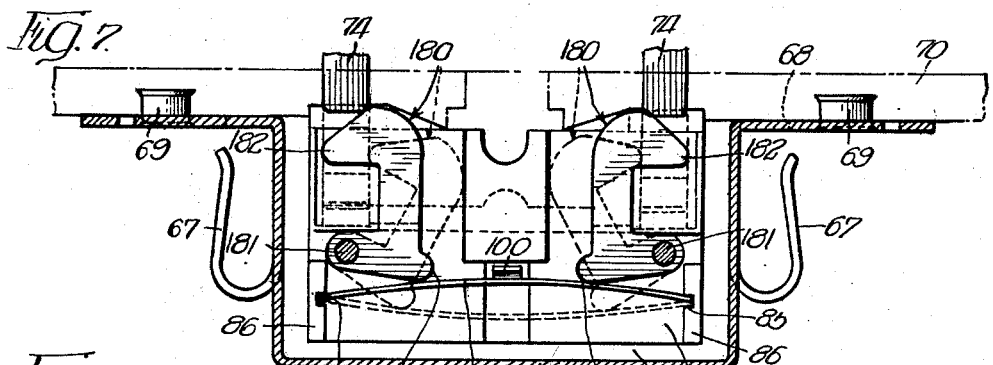
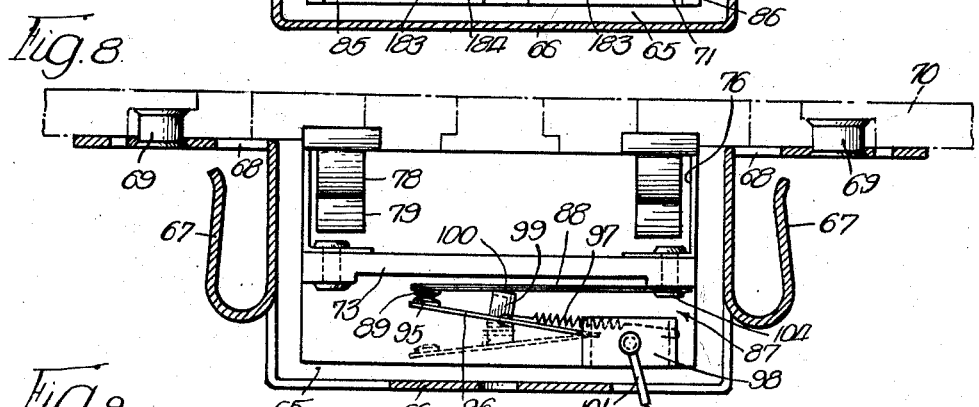
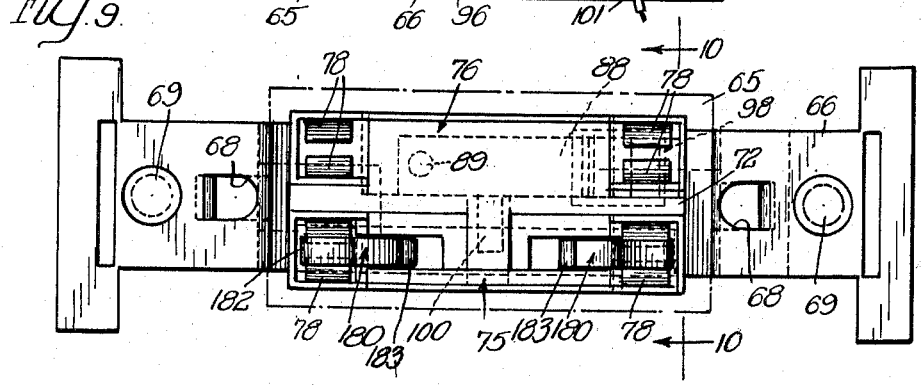
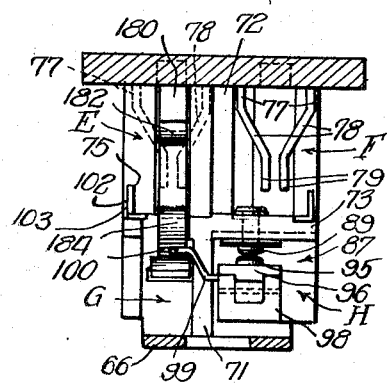

United States Patent Office 3,169,239
Patented Feb. 9, 1965

3,169,239
CIRCUIT BREAKING RECEPTACLE
Robert E. Lacey, 5915 W. Bryn Mawr, Chicago, Ill.
Filed Oct. 30, 1961, Ser. No. 149,153
8 Claims. (Cl. 340—252)

The present invention relates to electrical power distributor stations and particularly to those of the wall outlet type.

This application is a continuation-in-part of my application Serial No. 784,927 filed January 5, 1959, now abandoned.

The wide use of electrical appliances in homes has created a demand for high amperage supplies into the home and proportionately scaled high amperage distribution lines to wall receptacle outlets within the home. The input terminal in the home is normally the fuse box incuding fuses or circuit breakers adapted to cut out any distribution line when the power demands made thereon appear to exceed a predetermined standard. This avoids any overloading of the branch lines themselves and thereby avoids dangers of combustion as by overheating of the branch line conductors.

However, it is quite common for any branch line within a building to be provided with a number of electrical outlets, it being reasoned that any appliance connected to the outlet will consume only a portion of the allotted current for that branch line. In such an arrangement, it is possible for a single appliance connected in the branch line to consume all of the power properly applicable thereto without creating any danger for that distribution line but at the same time presenting a dangerous situation for the appliance so connected. Specifically, a branch line may be adapted to comfortably carry 15 amperes at 110 volts whereas the extension line between the outlet and the appliance may be rated and safe for conducting a current of only 10 amperes. In the case of a malfunction occurring in the appliance which may cause say, for example, 12 amperes to be drawn through the extension line, the branch line could adequately and easily supply such current to the electrical outlet receptacle whereas the line connected thereto may become overheated and create a fire hazard.

It is a general object of the present invention to provide a new and improved electrical outlet of the wall type which will monitor the current being supplied thereat to a connected appliance and will render an automatic indication of an abnormal condition in the event of unusually high power demands.

A more specific object of the invention is to provide a new and improved electrical wall outlet including a current metering device which will interrupt the connection through the outlet in the event the current flow therethrough becomes abnormal.

A more specific object of the invention is to provide an electrical outlet provided with a thermostatic control element which, under conditions of abnormal current flow, will interrupt the current supply connection and render an alarm signal to indicate the abnormal condition.

A further object of the invention is to provide an electrical wall outlet provided with a switch automatically controlled by the current flow through the outlet to interrupt the connection when the flow becomes abnormal and to recomplete the connection only when the abnormal condition is removed.

A specific object of the invention is to provide an electrical wall outlet provided with a bi-metallic control snap-action switch responsive to abnormal current flow through the outlet for interrupting the current supply connection outlet and at the same time completing an alarm circuit for rendering an indication of the abnormal condition. Due to the bi-metallic switch construction the opened switch is automatically reclosed after a brief interval for re-establishing the current supply connection through the electrical wall outlet.

A more specific object of the invention is to provide a wall outlet having a bi-metallic control snap-action switch responsive to abnormal current flow through the outlet for interrupting the current supply connection outlet, and one having means for preventing the reestablishing of the current supply connection through the electrical wall outlet until the abnormal condition is removed.

The invention, both as to its structural arrangement and method of operation, and additional objects and features thereof, will be understood by reference to the following specification and drawings forming a part thereof wherein:

FIGURE 1 is a face view of the electrical wall outlet in accordance with the invention as provided with a face plate;

FIGURE 2 is a top view of the electrical outlet arrangement in accordance with the invention shown in a slightly larger scale than in FIGURE 1;

FIGURE 3 is a rear elevational view of the arrangement;

FIGURE 4 is a front elevational view of the arrangement in accordance with the invention;

FIGURE 5 is an end elevational view of the electrical outlet structure of the invention;

FIGURE 6 is a circuit diagram in schematic form of the switch of the electrical outlet in accordance with the invention;

FIGURE 7 is a vertical sectional view through the case of the receptacle showing one side of a modified form of the device;

FIGURE 8 is a view similar to FIGURE 7, showing the other side of the device;

FIGURE 9 is a front elevational view of the modified form of the device; and

FIGURE 10 is a section on the line 10—10 of FIGURE 9.

Referring now to the drawings and particularly to FIGURES 2 to 6 thereof, the electrical outlet arrangement in accordance with the invention includes a base frame 10, a first pair of conductive clips 20A and 20B and a second pair of conductive clips 30A and 30B, a switch 40, a flexure element 41, and an indicator circuit arrangement 60.

The base frame 10 is made up of a planar member 11 perpendicularly bisected by a planar member 12 so as to define a frame having four quadrants identified in FIGURE 5 as quadrants A, B, C and D. Spaced from one end of the frame 10 and lying in quadrant D perpendicular to both the planar members 11 and 12 is a divider member 13. Opposite the planar member 13 and in the next adjacent quadrant C is a similar divider member 14. Spaced from the other end of the frame 10 and positioned in the quadrants D and C are corresponding divider members 15 and 16, respectively. Further, a stub 17 projecting from the planar member 11 and perpendicular to the planar member 12 is carried in the quadrant B.

Each of the conductive clips 20A, 20B, 30A and 30B is shaped so as to form a female receptacle for receiving the prong of an electrical appliance plug. Specifically, as best shown in FIGURE 2, each of the clips, when viewed from the side, is of a substantially S-shaped configuration, having a planar central portion 21, a planar head portion 22 and a tail portion 23, the latter of which is bent and shaped so as to form the female receptacle. In the case of the clips 20A and 20B, the tail portions 23 and the central portion 21 in each member are made to overlie the divider sections 13 and 14, respectively, of the frame 10 with the head sections 22 thereof being secured to the planar member 11 in the corresponding quadrant. The clips 30A and 30B are similarly formed and shaped so as to overlie the divider members 15 and 16, respectively, of the frame 10 and to be connected to the planar member 11.

It will be noted that the pair of spring fingers forming each of the clips 20A, 20B, 30A and 30B converge away from entering slots in the face of the receptacle, so that the prongs of a cooperative male plug, not shown, when inserted in said slots must be all the away in before the free ends of said prongs engage the fingers of the clips.

The ground prong 31 extends across the bottom of the planar member 12 and the ends 32—32 are turned upwardly at the sides of the unit, forming a ground for the ground prong of an associated plug, which ground prong enters the unit through openings 33—33 therefore in the face 92 of the unit.

There is thus provided a unit wherein when an associated three-pronged plug is applied to the receptacle, the ground prong will contact ends 32, before the other prongs make contact with the clips 20A and 20B or 30A and 30B as the case may be. This is very desirable and is the reason why the said clips converge away from the face of the unit.

The flexure element 41 is a bi-metallic strip connected at one end thereof to a conductive bracket 42, joined to the frame 10, and curved back upon itself at the other end. The switch 40 comprises a pair of contacts 43 and 44 of which the contact 44 is secured to a planar member 11 of the frame and connected electrically to the conductive clips 20A and 30A. The contact 43 is carried at the free end of a blade 45 which blade is pivotally supported at its other end to a support 46. The central portion of the blade 45 and the free end of the bi-metallic element 41 are joined by a spring 47 held in tension therebetween.

In the switch and flexure element structure just described, at ambient temperatures the bi-metalic strip 41 is positioned so that the spring 47 is removed from the pivotal center of the blade 45 thereby causing the contacts 43 and 44 to be closed. As the temperature increases from the ambient the bi-metallic element 41 is flexed so as to move the spring 47 through the pivotal point whereupon the blade 45 and the associated contact 43 is moved from engagement with the contact 44 thereby opening the switch. As the device again cools to ambient temperature, the bi-metallic element 41 is flexed so as to reversibly move the spring 47 through the pivotal point of the blade 45 so as to move the contact 43 into association with the contact 44 thereby closing the switch. By virtue of the fact that the spring is in tension and is moved back and forth past the pivotal point of the blade 45, the action of the blade in moving between its positions occurs suddenly, so that the switch is characterized as a "snap-action" switch.

The alarm element 60 includes a low amperage neon glow lamp 61 and a resistance element 62 connected in series therewith across the contacts 43 and 44. On the frame 10, the glow lamp 61 is mounted crossways to the planar member 12 and in extension therethrough.

In the arrangement shown, power is supplied to the unit by a conductor 81 at a terminal 82 on the bracket 42 and by a conductor 83 at a terminal 84 associated electrically with the electrical clips 20B and 30B. From the terminal 82, a circuit is completed through the bracket 42, the bi-metallic strip 41, conductor 48 extending to terminal 49 to which bracket 46 is mounted and thence via the switch blade 45 and the contacts 43 and 44 to the electrical clips 30A and 20A. At the terminal 49, a circuit is also completed through the neon glow tube 61 and resistor 62 to the electrical clips 30A and 20A.

From the schematic representation of FIGURE 6, it is evident that the conductor 83 completes a connection directly to the electrical clips 20B and 30B and that the conductor 81 completes a low impedance connection via the bi-metallic strip 41, the switch blade 45 and the contacts 43 and 44 to the clips 20A and 20B. Also a circuit is completed from conductor 81 via the bi-metallic strip 41, the neon glow lamp 61 and the resistor 62 to the clips 20A and 30A. Under normal operating conditions, when an electrical appliance is connected at the electrical receptacle formed by the clips 20A and 20B or the electrical receptacle formed by the clips 30A and 30B, a loop circuit is completed to the power source whereby current flows through the low impedance path of the switch blade 45 and the contacts 43 and 44 rather than through the neon lamp 61 and resistor 62. Under ordinary temperature and current conditions, the current flow through the bi-metallic material 41 is not sufficient to cause displacement of the tension spring 47 so that the switch 40 remains closed at the contacts 43 and 44.

However, considering an abnormal condition such as, for example, where a short circuit develops in the electrical appliance so that a high amperage current flow is experienced through the bi-metallic material 41, a heating takes place therein whereby the bi-metallic material is flexed so as to displace the tension spring 47 relative to the pivotal point of the blade 45 thereby causing the switch 40 to snap open at the contacts 43 and 44 with no arcing whatever. In this circumstance and assuming that the abnormal condition continues to exist in the electrical appliance, a circuit is completed via the neon glow lamp 61 and the resistor 62 whereby the lamp is illuminated to render a visual indication of the abnormal condition. The magnitude of the resistor 62 is selected to be sufficiently high to limit current flow through the bi-metallic material 41 and thereby reduce the temperature of the strip 41 whereby the strip is moved towards its original position to close the switch 40 at the contacts 43 and 44. Thus the low impedance path is completed by passing the neon glow lamp 61 and the resistor 62 whereby the lamp is extinguished.

If the alarm condition continues in the connected electrical appliance, the switch 40 will again be opened due to the heating occurring within the bi-metallic strip 41 and the alarm lamp 61 will again be illuminated. Thus the device will alternately switch on and off illuminating and extinguishing the alarm lamp to attract the person in attendance at the appliance. When the appliance is removed from the electrical connection with the receptacle device, the current flow is interrupted whereby the bi-metallic material 41 cools thereby closing the switch 40 at the contacts 43 and 44 rendering the electrical outlet again available as a station for distributing electrical power.

It is to be observed that when the bi-metallic strip 41 is flexed by virtue of a heavy current flow therethrough causing the opening of the switch 40, the continued flow of current therethrough and through the alarm circuit 60 restrains the bi-metallic strip from quickly restoring to its normal condition. Accordingly, the alarm lamp 61 will tend to stay illuminated for an extended interval. However, as soon as the faulty electrical appliance is disconnected from the wall receptacle, the current flow through the bi-metallic strip 41 is completely interrupted whereby the device quickly flexes back to its normal position, closing switch 40 so as to prepare for renewed operation.

The completed and finished electrical receptacle unit in accordance with the invention is clearly illustrated in FIGURE 1 wherein the device is depicted as mounted for use in the wall of a building, for example. Therein the electrical clips 20A and 20B are carried within the mounting 90 forming one receptacle and the clips 30A and 30B are carried within the mounting 91 forming another receptacle and a face plate 92 apertured to receive the mountings 90 and 91 and carrying in its midsection a window 93 for viewing the neon glow lamp 61.

FIGURES 7 to 10, inclusive, of the drawings show a modified form of an electrical outlet. As disclosed in these drawings, the electrical outlet has a box portion 65. Partially encircling this box portion 65 there is a ground clip and retainer 66 having punched out portions 67 which are bent upward to form a ground contact for the ground prong of a three-pronged plug in case this type of electrical plug is used with the electrical outlet. Holes 68 are punched in the retainer to provide an entranceway for such plug.

Means such as rivets 69 are provided so that the retainer 66 can be secured to a face plate 70 to hold the electrical outlet box portion 65 against such face plate. The ground clip and retainer 66 can be of brass while the box portion 65 can be of any suitable material.

A sub-assembly is adapted to be inserted in the box portion 65 to carry the components of this modified form of electrical outlet. This sub-assembly is roughly of X-shape and extends the length of the box portion 65. There is a vertical wall 71 adapted to rest on the bottom of the box portion 65 and a second vertical wall portion 72 which is slightly offset from the first vertical wall and extends upward from a junction point of the two vertical walls and a horizontally disposed wall 73. As thus formed, this sub-assembly provides four quadrants E, F, G and H for assembly of the outlet components in a manner to be described.

The modified form of my novel electrical outlet is adapted to provide two female receptacles for the well known type of electric plug having male prongs, portions of which are shown at 74. These female receptacles are formed from brass clip members in a manner as described in conjunction with the conductive clips 20A, 20B, 30A and 30B used in the embodiment of FIGURES 1 to 6, inclusive, and it is not thought that a detailed description of these clips is again necessary. However, it can be seen in FIGURE 9 that clip member 75 rests in quadrant E while clip member 76 rests in quadrant F and the adjacent pairs of female receptacles provide the receptacle for the prongs of the plug on the end of an electric cord. It can be noted that the receptacles are formed with an upper wide mouth defined by parallel walls 77, 77, a constricting portion defined by converging walls 78, 78, and a lower narrow portion defined by parallel walls 79, 79.

As can be seen, particularly in FIGURES 7 and 10, there are two C-shaped dog members generally indicated at 180, which are pivotally mounted at 181 in quadrant G, and which have nose portions 182 that can extend into the wide mouth portion of the female receptacles located in quadrant E. As shown in FIGURE 7, this dog member 180 has a shoulder portion 183 adapted to rest on a leaf spring 184 located in quadrant G. This leaf spring 184 is loosely mounted at its ends in slot 85 in the wall portions 86 so that it can flex from the position shown in full lines to the position shown in dotted lines. As can be noted, the nose 182 of the dog 180 lies in the wide mouth portion of the female receptacle when the spring is in the full line position, but when the prong 74 is inserted in the mouth of the receptacle and is forced inward, then the dog is moved to the dotted line position and spring 184 is flexed to its dotted line position. Removal of prong 74 results in spring 184 returning the dog 180 to full line position. The purpose of this dog and spring movement will be described more in detail later.

Turning now to quadrant H, there is a switch unit generally indicated at 87 which includes a bi-metallic strip 88 having a contact 89 associated with a contact 95 on swingable arm 96. A spring 97 connected to swingable arm 96 at its mid-point and to bracket 98 provides means for snapping the swingable arm from its full line position to its dotted line position, or from its dotted line position to its full line position. This action will be described in greater detail later.

As can be noted, swingable arm 96 carries an S-shaped clip member indicated at 99 and this clip member extends through an opening in vertical wall member 71 from quadrant H to quadrant G where its end 100 lies in the path of movement of the spring 184. One lead 101 of the electrical circuit feeding the electrical outlet is connected to bracket 98 while the other lead 102 of the electrical circuit is connected at 103 to the clip 75. Thus electric current flow is through electric lead 101 to bracket 98, swingable arm 96, contact 95, contact 89, bi-metallic strip 88, and through a rivet connection 104 to clip 76 and returning through clip 75, contact 103, to the other electrical lead 102 of the electrical circuit.

Assuming now that an appliance is to be used and the prong members of a plug are inserted into an adjacent pair of the female receptacles in my novel electrical outlet, the prong 74 causes dog 180 to move to the dotted line position, and spring 184 to move to its dotted line position. At this time it should be noted that the end 100 of the S-shaped member 99 is disposed at the position shown in FIGURE 7, which is above both the dotted line and the full line position of spring 184. This is the normal condition when there is no abnormal flow of electric current through the outlet box. However, assume that an abnormal condition exists so that abnormal current flow passes through the bi-metallic strip 88. Bi-metallic strip 88 will then flex forcing swingable arm 96 downward to a point where the spring 97 snaps open the contact 95 from contact 89 and the swingable arm lies in its dotted line position. It can now be noted that the S-shaped member 99 also is in a down position and in this position the end 100 of this S-shaped member lies intermediate the full line position and the dotted line position of spring 184. In this situation no current flow will pass through the electrical outlet and it is necessary to remove the prongs of the electric plug from the outlet before the switch 87 can be reset. If the prongs are removed, spring 184 acts to return dog 180 to its full line position but in doing so spring 184 also strikes the end 100 of S-shaped member 99 forcing the swingable arm 96 upward until spring 97 snaps contact 95 and contact 89 together again and the electrical circuit to the female receptacles is again completed. Thus the receptacle is again ready for insertion of the prongs of an electric plug and current can be fed to the associated electrical appliance. Of course if the abnormal condition still exists, the bi-metallic strip 88 will again cause the switch 87 to open and it will again be necessary to withdraw the prongs of the plug to reset the switch for current flow to the female receptacles of the outlet.

In view of the foregoing, it is clear that there has been provided herein an improved electrical outlet structure useful as a station for distributing electrical power and in its capacity as a power distributor monitors the current so as to automatically interrupt the supply circuit when the current flow exceeds a predetermined given amount and to render an alarm signal indicative of the alarm condition. An obvious advantage of the present system is that not only does it detect an abnormal condition but in response to the detection, it interrupts the circuit for supplying current to the faulty device and renders an alarm to the person in attendance indicating that the connected device is faulty. A further advantage of the system is that it need not be manually reset but that it automatically re-sets and tests the connected device to determine if the normal condition has been re-established. When the device is finally disconnected from the circuit, the device will restore itself thereby preparing for the renewed operation.

Although the arrangement described herein has described an alarm circuit exemplified by a neon glow lamp, it is understood that any other type of visual or audio alarm device could be employed. The snap-action switch described herein could be replaced by any other type of receptacle switch with the understanding that the fast acting switch is desirable in order to prevent arcing and pitting of the contacts of the switch.

The arrangement described is at present considered to be preferred, but it is understood that variations and modifications may be made therein, and it is intended to cover in the appended claims all such variations and modifications as fall within the true spirit and scope of the invention.

I claim:

1. An electrical outlet comprising first means for connecting said outlet to a source of electric power, second means for connecting a power consuming electric appliance to said outlet, an electrical circuit connected between said first means and said second means to permit an electrical current flow therebetween, a bi-metallic conductive element in said circuit and responsive to current flow therethrough for causing corresponding deforming movements therein, a snap-action electrical switch operated by and connected in series with said element between said first and second means and being operative between a closed position and an opened position responsive to different positions of said element, said element normally being positioned to maintain said electrical switch closed and being flexed into an abnormal position responsive to a current flow in excess of a predetermined rate thereby to operate said electrical switch into said opened position and interrupt said excessive current flow therethrough, an electrical impedance and electrical signal means also connected in series with said element between said first and second means, the combined impedance of said electrical signal means and said electrical impedance being sufficiently high to cause a signal indication only when there is an interruption of the electrical circuit connection at said electrical switch, the activating current flow through the electrical signal means also flowing through said element when said switch is in open position and when said electrical appliance is connected to said outlet, whereby the bi-metallic conductive element is restrained in said abnormal position for an appreciable time and there is a time delay in re-closing said snap-action electrical switch.

2. An electrical outlet as set forth in claim 1 wherein said electrical impedance means is an electrical resistor and said electrical signal means is a glow lamp.

3. An electrical outlet comprising an insulating housing structure, a pair of terminals on said structure for connecting said outlet to a source of electrical power, an electrical circuit within the housing for connecting a power consuming electric appliance to said source, a bi-metallic flexure element connected in series in said electrical circuit, said element connected at one end to one of said terminals and curved back upon itself at the other end, a switch blade pivotally supported at one end on said structure and carrying a contact point at the other end, an associated contact on said housing, a tension spring attached at one end to the end of the curved portion of the flexure element, the other end of said spring being attached to the central portion of said blade to cause a snap-action engagement or disengagement of said contact point with said contact responsive to the flexing of said flexure element, said switch blade being connected in series with said bi-metallic flexure element and in the electrical circuit between the source of electric power and the consuming electric appliance, and electrical signal means connected in series with said bi-metallic flexure element in said electrical circuit to render an alarm condition responsive to interruption of the circuit connection at the contact point and contact, said signal means permitting a current flow through said element when said contact point and said contact are in open position and when said appliance is connected to said outlet, whereby the flexing of the flexure element to cause a snap-action engagement of said contact point with said contact is appreciably delayed.

4. An electrical outlet comprising first means for connecting said outlet to a source of electric power, second means for connecting a power consuming electric appliance to said outlet, electrical circuit means having a bi-metallic conductive element therein responsive to current flow therethrough for causing corresponding deforming movements therein, a snap-action electrical switch operated by and connected in series in said electrical circuit means with said element between said first and second means and being operative between a first position and a second position, said element normally being positioned to maintain said electrical switch in said first position, permitting electrical current flow between said first and second means and being fixed into an abnormal position responsive to a current flow in excess of a predetermined rate thereby to operate said electrical switch into said second position and interrupt said excessive current flow therethrough, an electrical signal means and an electrical impedance being connected in series between said bi-metallic conductive element and said second means, the electrical impedance of this series connection being sufficiently high so that the electrical signal means is not actuated when said electrical switch is in said first position, said electrical signal means being activated when said electrical switch is operated to said second position by said element, the actuating electrical current through said electrical signal means being substantially less than said excess current flow, said actuating electrical current flow through said bi-metallic conductive element being effective to cause a time delay in the movement of the associated snap-action electrical switch to its first position.

5. An electrical outlet comprising a box portion with a sub-assembly frame therein, first and second side by side female sockets mounted on said sub-assembly, each socket having a pair of prong receivers for the prongs of a male plug inserted into the socket, electrical terminal means mounted on said sub-assembly to which a source of electrical power can be connected, electrical circuit means through which electrical current can flow from said electrical terminal means to said respective pairs of prong receivers, said electrical circuit means including an electrical switch having a bi-metallic element and a movable member with associated electrical contacts on said element and on said member, said movable member being in a first position when the electrical contacts are together and said electrical switch is closed to allow electrical current flow to the prong receivers, said movable member being urged to a second position by the bi-metallic element in the event of excess electrical current flow in the electrical circuit, said electrical contacts of the electrical switch being separated in said second position so as to prevent a flow of electrical current through said switch, a first pivoted dog means including a portion extending into at least one of the prong receivers of said first socket, a second pivoted dog means having a portion extending into at least one of the prong receivers of said second sockets, each of said portions being engaged and moved by a prong of the male plug inserted into its associated socket in order to pivot the dog means carrying that portion, an elongated leaf spring engaging both of said dog means and deflectable from one position to another when either of said dog means is pivoted, said leaf spring being effective to return both of said dog means as it moves from said another position to said one position when both sockets are empty, said leaf spring during its return engaging said movable member to return it from said second position to said first position in the event that said movable member has been moved to said second position.

6. An electrical outlet comprising a box portion with a sub-assembly frame therein, first and second side by side female sockets mounted on said sub-assembly, each socket having a pair of prong receivers for the prongs of a male plug inserted into the socket, electrical terminal means mounted on said sub-assembly to which a source of electrical power can be connected, electrical circuit means through which electrical current can flow from said electrical terminal means to said respective pairs of prong receivers, said electrical circuit means including an electrical switch having a bi-metallic element and a movable member with associated electrical contacts on said element and on said member, said movable member being in a first position when the electrical contacts are together and said electrical switch is closed to allow electrical current flow to the prong receivers, said movable member being urged to a second position by the bi-metallic element in the event of excess electrical current flow in the electrical circuit, said electrical contacts of the electrical switch being separated in said second position so as to prevent a flow of electrical current through said switch, an operating mechanism including elements respectively engaged and moved by the prongs of a male plug inserted into the prong receivers, an actuating means engaged by said operating mechanism and movable from one position to another when either of said elements is moved, and biasing means for returning said actuating means from said another position to said one position when both female sockets are empty, said actuating means during its return engaging said movable member to return it from said second position to said first position in the event that said movable member has been moved to said second position.

7. An electrical outlet comprising a box portion with a sub-assembly frame therein, first and second side by side female sockets mounted on said sub-assembly, each socket having a pair of prong receivers for the prongs of a male plug inserted into the socket, electrical terminal means mounted on said sub-assembly to which a source of electrical power can be connected, electrical circuit means through which electrical current can flow from said electrical terminal means to said respective pairs of prong receivers, said electrical circuit means including an electrical switch having a bi-metallic element and a movable member with associated electrical contacts on said element and on said member, said movable member being in a first position when the electrical contacts are together and said electrical switch is closed to allow electrical current flow to the prong receivers, said movable member being urged to a second position by the bi-metallic element in the event of excess electrical current flow in the electrical circuit, said electrical contacts of the electrical switch being separated in said second position so as to prevent a flow of electrical current through said switch, a pivoted dog means including a portion extending into at least one of the prong receivers of said socket, said portion being engaged and moved by a prong of the male plug inserted into said socket in order to pivot the dog means, a leaf spring engaging said dog means and deflectable from one position to another when said dog means is pivoted, said leaf spring being effective to return said dog means from said another position to said one position when said socket is empty, said leaf spring during its return engaging said movable member to return it from said second position to said first position in the event that said movable member has been moved to said second position.

8. An electrical outlet comprising a box portion with a sub-assembly frame therein, first and second side by side female sockets mounted on said sub-assembly, each socket having a pair of prong receivers for the prongs of a male plug inserted into the socket, electrical terminal means mounted on said sub-assembly to which a source of electrical power can be connected, electrical circuit means through which electrical current can flow from said electrical terminal means to said respective pairs of prong receivers, said electrical circuit means including an electrical switch having a bi-metallic element and a movable member with associated electrical contacts on said element and on said member, said movable member being in a first position when the electrical contacts are together and said electrical switch is closed to allow electrical current flow to the prong receivers, said movable member being urged to a second position by the bi-metallic element in the event of excess electrical current flow in the electrical circuit, said electrical contacts of the electrical switch being separated in said second position so as to prevent a flow of electrical current through said switch, a pivoted dog means including a portion extending into at least one of the prong receivers of said socket, said portion being engaged and moved by a prong of the male plug inserted into said socket in order to pivot the dog means, an actuating means engaging said dog means and deflectable from one position to another when said dog means is pivoted, means for returning said actuating means from said another position to said one position when said socket is empty, said actuating means during its return engaging said movable member to return it from said second position to said first position in the event that said movable member has been moved to said second position.

References Cited by the Examiner

UNITED STATES PATENTS

| | | | |
|---|---|---|---|
| 1,596,018 | 8/26 | Mueller | 200—136.5 |
| 2,074,400 | 3/37 | Kauffman | 200—121 |
| 2,256,537 | 9/41 | Wulle | 200—166 XR |
| 2,508,637 | 5/50 | Bolesky | 200—115.5 |
| 2,592,989 | 4/52 | Wilson | 340—252 |
| 2,952,759 | 9/60 | Kircher | 200—136.5 |
| 2,956,136 | 10/60 | Schwaneke | 200—136.5 XR |

FOREIGN PATENTS

| | | |
|---|---|---|
| 457,396 | 6/49 | Canada. |
| 578,131 | 6/59 | Canada. |
| 640,318 | 7/50 | Great Britain. |

NEIL C. READ, *Primary Examiner.*